(12) United States Patent
Tungler et al.

(10) Patent No.: US 8,052,877 B2
(45) Date of Patent: Nov. 8, 2011

(54) CHEMICAL PROCESS

(75) Inventors: Antal Tungler, Budapest (HU); Gabor Bajnoczy, Budapest (HU); Erzsebet Odor, Budapest (HU)

(73) Assignee: Sanofi-Aventis, Paris (FR)

( * ) Notice: Subject to any disclaimer, the term of this patent is extended or adjusted under 35 U.S.C. 154(b) by 0 days.

(21) Appl. No.: 12/644,418

(22) Filed: Dec. 22, 2009

(65) Prior Publication Data
US 2010/0181262 A1  Jul. 22, 2010

Related U.S. Application Data

(63) Continuation of application No. PCT/HU2008/000064, filed on Jun. 4, 2008.

(30) Foreign Application Priority Data

Jun. 27, 2007 (HU) ..................... 0700440

(51) Int. Cl.
*C02F 1/70* (2006.01)
(52) U.S. Cl. ...................... 210/757; 210/903
(58) Field of Classification Search .............. 210/757, 210/903; 588/319; 502/301, 326, 332, 336, 502/341, 342, 343
See application file for complete search history.

(56) References Cited

U.S. PATENT DOCUMENTS

| 4,004,994 A | 1/1977 | Andrus |
| 4,236,982 A | 12/1980 | Polson |
| 5,073,273 A | 12/1991 | Gupta et al. |
| 5,457,265 A | 10/1995 | Heubner et al. |
| 6,024,860 A | 2/2000 | Cash et al. |

FOREIGN PATENT DOCUMENTS

GB  2332210  6/1999

OTHER PUBLICATIONS

Greene et al., "Destruction or decomposition of hypergolic chemicals in a liquid propellant testing laboratory" (2004), Chemical Health & Safety, Jan./Feb., pp. 6-13.*
Augustine, R. "Heterogeneous Catalysis for the Synthetic Chemist" (1996), Marcel Dekker, pp. 247-251.*

* cited by examiner

*Primary Examiner* — Nam Nguyen
*Assistant Examiner* — Lucas Stelling
(74) *Attorney, Agent, or Firm* — James W. Bolcsak; Scully, Scott, Murphy & Presser, P.C.

(57) ABSTRACT

A process for the removal of azide ions from aqueous liquids at alkaline pH by alkali-soluble metals and catalyst or by hydrogen and catalyst.

12 Claims, No Drawings

CHEMICAL PROCESS

The subject of the present invention is a new process for the removal of azide ions from aqueous liquids, first of all from waste waters.

Azides, e.g. sodium azide, potassium azide are frequently used in chemical syntheses. A synthesis of this type is for example described in U.S. Pat. No. 5,629,331 and patent application WO-2006/023889, where a tetrazole ring is built by applying sodium azide in aqueous alkaline solution.

The azide ions remain in the aqueous phase of the reaction mixtures in considerable concentration. When these aqueous phases are treated as waste waters, it is of major importance that the azide ion concentration is decreased to very low level, since the azide ions in aqueous solutions are toxic, even at a concentration of 50 mg/l.

Consequently, there is a considerable need for processes suitable to remove the azide ions from aqueous alkaline solutions, first of all from waste waters.

We have found that by treating the azide ion-containing aqueous liquids at alkaline pH with one or more metals soluble under alkaline conditions in the presence of nickel catalyst, or with hydrogen in the presence of nickel catalyst, then the azide ions present in the solution are reduced by the resulting hydrogen, giving rise to ammonia and nitrogen during the formation of hydroxide ions.

The equation is the following:

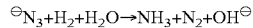

$$^{\ominus}N_3 + H_2 + H_2O \rightarrow NH_3 + N_2 + OH^{\ominus}$$

In this way the toxic azide ions can be removed from aqueous liquids, first of all from waste waters.

In the process according to the invention as for alkali-soluble metal we use e.g. aluminium or zinc, and as catalyst we use nickel. Preferably the alloy or the mixture of these metals is used, their ratio and the particle distribution is deliberate. In general, metal powders with fine particles are favorable (e.g. Raney-nickel). If the pH of the azide-containing liquid is not alkaline, it has to be set to alkaline with bases, preferably with inorganic bases, e.g. sodium hydroxide or potassium hydroxide.

The process is performed at a temperature lower than the boiling point of the liquid to be purified, preferably between +5° C. and +40° C. A preferred embodiment of the process is the catalytic reaction under hydrogen atmosphere in the presence of nickel. The applied pressure is preferably between the atmospheric pressure and 60 bar.

The process according to the invention can be used very efficiently for the removal of azide-ions from alkaline or alkalinized waste-waters, ensuring an environment-friendly purification process, since it results only well-recoverable metal ions, nitrogen gas and ammonia, which are easily treatable products. The process can be used in large scale. The applied metals can also be wastes or by-products of metal processing or metallurgy (powders, chip or cast scrap).

By the process according to the invention the azide-ion concentration can be decreased to below 5 ppm. When implementing the process according to the invention, the azide-ion concentration was determined by the ion-chromatographic analytical method described here below. By this method we were able to follow the decrease of the azide-ion concentration in various waste waters.

Sample Preparation

Before the measurement the sample to be investigated was diluted with 0.1 N sodium hydroxide solution to 50-fold of its volume, because of the expected high organic material concentration and high azide level.

Conditions of the Measurement

Investigated component: azide content
Instrument: DIONEX 600-type ion-chromatographic system with conductometric detector
Column: IONPAC AS 10. 250 mm long, 4 mm inner diameter, ethyl-vinyl-benzene/divinyl-benzene anion exchanger
Pre-column: IONPAC AG 10 DIONEX
Eluent: 0.1 N sodium hydroxide solution
Flow rate: 1.0 ml/min
Neutralization of the eluent: with self-regenerating "Anion Self Regenerating Suppressor"
Injected volume: 25 μl By this method we were able to determine the azide ion concentration from a level of 5 ppm.

Further details of the invention are demonstrated by the examples below, without limiting the claims to the examples.

EXAMPLES

Example 1

15 g of the alloy powder containing 50 mass % of nickel and 50 mass % of aluminium (particle size less than 100 micrometer) were weighed. 600 g of 27 mass % of aqueous sodium hydroxide solution containing azide-ions in 9000 ppm concentration (obtained in the reaction described in Example 1., step a.) of patent description U.S. Pat. No. 5,629,331) were weighed into an Erlenmeyer flask and placed in cold water bath. To this solution 15 g of alloy powder were added in small portions, during 4 h, under continuous stirring, while keeping the temperature of the mixture at 20° C. After the addition the mixture was stirred at 20° C. for an additional 5 h. By the end of this reaction time the gas evolution ceased.

The azide-ion concentration of the resulting aqueous solution was <5 ppm, as determined by the above ion-chromatographic method.

Example 2

10 g of aluminium powder and 0.2 g of nickel-aluminium alloy powder (with 50 mass % of nickel and 50 mass % of aluminium content, particle size less than 100 micrometer) were weighed. 600 g of 27 mass % of aqueous sodium hydroxide solution containing azide-ions in 9000 ppm concentration (U.S. Pat. No. 5,629,331, Example 1) were weighed into an Erlenmeyer flask and placed in cold water bath and stirred. To this solution under continuous stirring mixture of the metal powders was added in small portions during 4 h, while keeping the temperature of the mixture at 20° C. After the addition the mixture was stirred at 20° C. for additional 2 hours. Then 3 g of the 50 mass % of nickel—50 mass % of aluminium alloy powder were added to the alkaline solution, during 4 hours, and after the addition stirring was continued for 3 hours.

The azide-ion concentration of the resulting aqueous solution was <5 ppm, as determined by the above ion-chromatographic method.

Example 3

Into a 250 cm³ acid-resistant steel autoclave, equipped with magnetic stirrer, 0.5 g of Raney-nickel catalyst and 40 g of aqueous-alkaline solution of 7000 ppm azide-ion concentration (U.S. Pat. No. 5,629,331, Example 1.) (NaOH content 20 mass %) were placed. The container was flushed with nitrogen, then 3-times with hydrogen, filled with hydrogen to 50 bar pressure and stirred for 5 hours. After stopping the stirrer and release of the pressure, the reaction mixture was sedimented and decanted. The azide-ion concentration of the resulting aqueous solution was <10 ppm, as determined by the above ion-chromatographic method.

Example 4

Into a 850 cm$^3$ acid-resistant steel autoclave, equipped with magnetic stirrer, 4 g of Raney-nickel catalyst and 100 g of aqueous NaOH solution of 20 mass % were placed. The container was flushed with nitrogen, then 3-times with hydrogen. The autoclave was closed, filled with hydrogen to 10 bar pressure. With the help of a feeding pump a solution containing 1500 ppm azide ion and 25 mass % of sodium hydroxide (U.S. Pat. No. 5,629,331, Example 1.) was added with a speed of 250 g/h.

Samples were taken from the reaction mixture hourly, and the azide ion content was determined. After 3 hours the azide-ion concentration of the sample was <10 ppm, as determined by the above ion-chromatographic method.

What is claimed is:

1. A catalytic, non-electrolytical process for the removal of azide ions from aqueous liquids comprising treating an azide ion containing aqueous liquid at an alkaline pH with (a) one or more alkali-soluble metals and a catalyst, or with (b) hydrogen and a catalyst.

2. The process as defined in claim 1 wherein the one or more alkali-soluble metals comprise aluminum and zinc.

3. The process as defined in claim 1 wherein the catalyst is nickel.

4. The process as defined in claim 1 wherein the azide ion containing aqueous liquid is alkalinized by addition of an inorganic base to produce the alkaline pH.

5. The process as defined in claim 1 wherein the azide ion containing aqueous liquid has the alkaline pH.

6. The process as defined in claim 1 wherein the one or more alkali-soluble metals and the catalyst is selected from the group consisting of an aluminium-nickel mixture and an aluminium-nickel alloy.

7. The process as defined in claim 1 wherein the process is carried out at a temperature between +5° C. and +40° C.

8. The process as defined in claim 1 wherein the azide ion containing aqueous liquid is an aqueous solution.

9. The process as defined in claim 4 wherein the inorganic base is sodium hydroxide.

10. The process as defined in claim 1 wherein the process is carried out under a hydrogen atmosphere where hydrogen is formed during the dissolution of a metal.

11. The process as defined in claim 1 wherein the process is carried out at a pressure between atmospheric pressure and 60 bar, under a hydrogen atmosphere.

12. The process as defined in claim 1 wherein the azide ion containing aqueous liquid contains more than 90 mass % of water and the treatment at the alkaline pH is with the one or more alkali soluble metals and the catalysts.

* * * * *